(12) United States Patent
Laroia et al.

(10) Patent No.: US 6,985,433 B1
(45) Date of Patent: Jan. 10, 2006

(54) METHODS AND APPARATUS FOR DETERMINING MINIMUM CYCLICPREFIX DURATIONS

(75) Inventors: Rajiv Laroia, Basking Ridge, NJ (US); Junyi Li, Pine Brook, NJ (US)

(73) Assignee: Flarion Technologies, Inc., Bedminster, NJ (US)

( * ) Notice: Subject to any disclaimer, the term of this patent is extended or adjusted under 35 U.S.C. 154(b) by 852 days.

(21) Appl. No.: 09/689,273

(22) Filed: Oct. 12, 2000

Related U.S. Application Data

(60) Provisional application No. 60/233,000, filed on Sep. 15, 2000.

(51) Int. Cl.
*H04J 11/00* (2006.01)
(52) U.S. Cl. .................................. 370/208; 370/339
(58) Field of Classification Search ............... 370/203, 370/208, 210, 310, 328, 332, 334, 339, 343, 370/344, 464, 465, 480; 375/130, 132–134, 375/260
See application file for complete search history.

(56) References Cited

U.S. PATENT DOCUMENTS

| 5,915,210 | A | 6/1999 | Cameron et al. | |
|---|---|---|---|---|
| 6,061,405 | A | 5/2000 | Emami | |
| 6,362,781 | B1 * | 3/2002 | Thomas et al. | 370/344 |
| 6,535,550 | B1 * | 3/2003 | Cole | 375/222 |
| 6,687,307 | B1 * | 2/2004 | Anikhindi et al. | 370/344 |

FOREIGN PATENT DOCUMENTS

| EP | 0 982 906 A | 1/2000 |
|---|---|---|
| WO | WO 00/01084 | 1/2000 |

OTHER PUBLICATIONS

R. Pervez and M. Nakagawa, "Parallel Coded Optical Multicarrier Frequency Division Multiplexing—A Potential Step Towards High Speed, High Capacity and High Reliability in Optical Transmission Systems", IEICE Transactions on Communications, V. E79 B, No. 11, pp. 1677-1686, Nov. 1996.

J. Vankka, M. Kosunen, J. Hubach, and K. Halonen, "A Cordic-based Multicarrier QAM Modulator", Global Telecommunications Conference—Globecom '99, General Conference (Part A), pp. 173-177.

* cited by examiner

*Primary Examiner*—John Pezzlo
*Assistant Examiner*—Donald L Mills
(74) *Attorney, Agent, or Firm*—Straub & Pokotylo; Michael P. Straub

(57) ABSTRACT

Methods and apparatus for generating and transmitting frequency division multiplexed signals are described. Each transmitted FDM signal is generated by combining, e.g., multiplexing, a plurality of individual analog subcarrier signals together. Individual analog subcarrier signals are generated by processing one or more digital signals, e.g., symbols plus a cyclic prefix for each symbol, corresponding to the subcarrier to generate an analog subcarrier signal there from. A cyclic prefix incorporated into subcarrier signals is designed to be of sufficient length that it covers delays introduced by filters in the individual subcarrier signal paths and common signal path. The incorporated cyclic prefix has a minimum duration determined as a function of several group signal dealys including a common signal path group signal delay and a communications channel group signal delay.

7 Claims, 9 Drawing Sheets

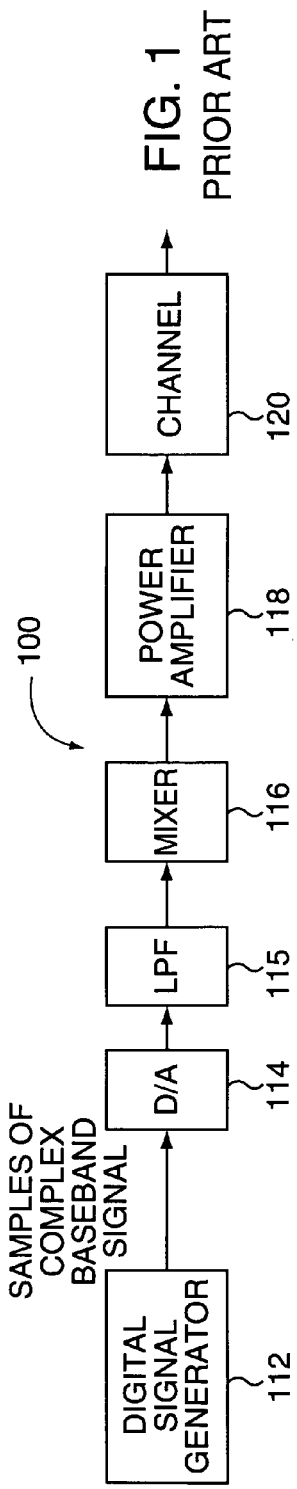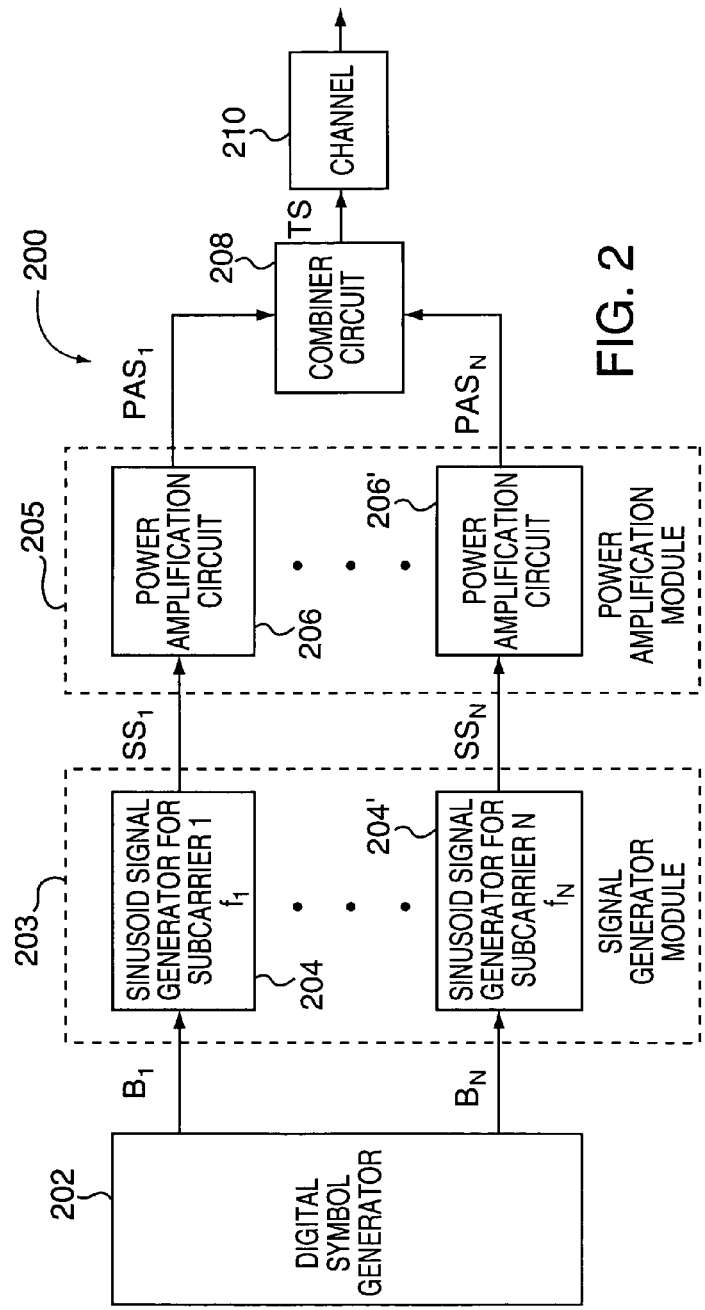

METHODS AND APPARATUS FOR DETERMINING MINIMUM CYCLICPREFIX DURATIONS

RELATED APPLICATIONS

This application claims the benefit of U.S. Provisional Application Ser. No. 60/233,000 filed Sep. 15, 2000.

FIELD OF THE INVENTION

The present invention is directed to methods and apparatus for communicating information and, more particularly, to methods and apparatus for generating and transmitting frequency division multiplexed signals.

BACKGROUND

In Frequency Division Multiplexing (FDM) communication systems, the available spectral bandwidth W is divided into a number of spaced sub-carriers, $f_1, \ldots, f_N$, which are used to transmit information. Specifically, information bits are first mapped to complex FDM symbols $B_1, \ldots, B_N$. The signal to be transmitted, S(t), is constructed by individually modulating those symbols onto the sub-carriers over an FDM symbol duration, that is, $$S(t) = \Sigma_{k=1}^{N} |B_k| \cos[2\pi f_k t + \theta_k],$$

where $|B_k|$ and $\theta_k$ are the amplitude and the phase of complex symbol $B_k$, respectively, and t is the time variable. Orthogonal Frequency Division Multiplexing (OFDM) is one particular example of FDM.

FIG. 1 illustrates a known system 100 for generating and transmitting an OFDM signal S(t). In the known system 100, a digital signal processor (DSP) 112, generates a sequence of baseband discrete complex samples of S(t), which are then converted to an analog continuous signal through use of a digital-to-analog converter 114. The analog signal generated by the D/A converter 114 is passed through a low-pass filter (LPF) 115, mixed to the carrier frequency by mixer 116, amplified with a power amplifier 118, and finally transmitted over the communication channel 120.

In the known system, information to be transmitted on sub-carriers is combined in the digital domain so that by the time digital to analog conversion occurs distinct sub-carrier symbols do not exist, e.g., separate symbols corresponding to different sub-carriers are not available to be subject to separate and distinct digital to analog conversion operations and/or separate analog signal processing operations.

One major drawback of the known OFDM signal generation technique is the high peak-to-average ratio of the transmitted signal to be amplified. Loosely speaking, the peak-to-average ratio is the ratio of the maximum and the average powers of a signal. In general, the signal reception capability depends on the average power of the signal. However, to avoid nonlinear distortion such as signal clipping, the power amplifier at the transmitter normally has to operate linearly across the full dynamic signal range of the generated signal. This usually requires use of a class A power amplifier. As a result of the linear nature of the power amplifier 118, the power consumption of the power amplifier mainly depends on the maximum transmission power. Hence, the peak-to-average ratio is an important measure of power consumption given the quality requirement of signal reception.

In the OFDM system 100, the analog signal to be amplified is the sum of many sinusoid waveforms, e.g., sub-carrier signal. Assuming complex OFDM symbols $B_1, \ldots, B_N$ are independent random variables, the analog signal at a given time instant will tend to be a Gaussian distributed random variable, which is well recognized to have a large peak-to-average ratio. Hence, the transmission of the OFDM signals generally consumes a significant amount of power, which is very undesirable, e.g., for mobile transmitters using battery as power supply. Various methods have been proposed to reduce the peak-to-average ratio of the OFDM signals. The basic ideas in these methods is to arrange complex symbols $B_1, \ldots, B_N$ appropriately to minimize the peak to average ratio. However, in such methods, the fundamental structure of signal transmission of combining sub-carrier signals first and then power amplifying the combined signal is normally the same as shown in FIG. 1.

Thus, in the existing methods, sub-carrier signals are first combined in the digital domain and then power amplified. This tends to result in large power consumption as the combined signals in general do not have a good, e.g., low, peak-to-average power ratio. In view of the above discussion, there is a need for improved frequency division multiplexed signal generation and transmission techniques which allow for lower peak-to-average power ratios and therefore improved energy efficiency during power amplification stages of signal generation. It is desirable that at least some of the new methods and apparatus be suitable for use with OFDM signals.

BRIEF DESCRIPTION OF THE FIGURES

FIG. 1 illustrates a known system for generating and transmitting OFDM signals.

FIG. 2 illustrates a system for generating and transmitting signals implemented in accordance with the present invention.

SUMMARY OF THE INVENTION

Figure 3A:
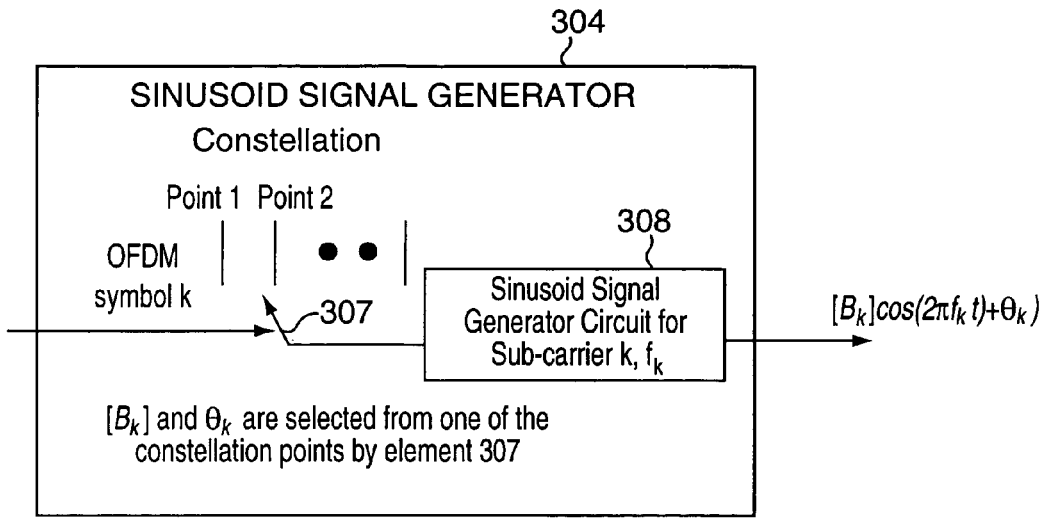
FIGS. 3A and 3B illustrate sinusoidal signal generators which can be used to generate an analog passband signal from DIGITAL OFDM symbols input thereto.

In accordance with the present invention, power consumption associated with generating and transmitting frequency division multiplexed signals, e.g., OFDM signals, is reduced as compared to the known system discussed above.

These results are achieved by performing power amplification on analog sub-carrier signals on an individual basis prior to combining them to form an OFDM signal to be transmitted. As the sub-carrier signals tend to be substantially in the form of sinusoid waveforms, the efficiency of power amplification of the individual sub-carrier signals will generally be higher than that of performing power amplification on a combined OFDM signal.

While the present invention is described throughout the present application in the context of various exemplary OFDM embodiments, it is to be understood that the methods and apparatus of the present invention are applicable to a wide range of FDM communications systems and are not limited solely to OFDM applications.

In accordance with the present invention, at each OFDM symbol duration, a sinusoid signal, e.g., analog signal, is generated for each sub-carrier, with the phase and the amplitude of the sub-carrier being set by a complex OFDM symbol at the beginning of the OFDM symbol duration. In one embodiment, the sinusoid signals are bandpass, wherein the signals can be first generated in the baseband and then mixed to the carrier frequency or alternatively can be generated directly in the bandpass. In another embodiment, the sinusoid signals are baseband, wherein the signals are to be mixed to the carrier frequency in a later stage. In one embodiment of the invention, the sinusoid signal is generated by an analog signal generator, where the phase and the amplitude of the sub-carrier waveform are set by an OFDM sub-carrier symbol. In another embodiment of the invention, individual sub-carrier sinusoid signals are generated from separate sequences of digital samples passing through digital-to-analog convertor devices.

The complex OFDM symbol transmitted on each sub-carrier is generated by a digital device and is to convey information bits to be communicated. In one embodiment of the invention, the OFDM symbols corresponding to a sub-carrier at different symbol durations are preferably of constant or near constant amplitude, thereby leading to a constant-amplitude phase-modulated sinusoid signal for each sub-carrier. In such an embodiment, the amplifiers used for individual sub-carrier signals may have a fixed gain. However, even when fixed gain amplifiers are used, the gain applied by different amplifiers corresponding to different sub-carriers may differ from one another.

According to the invention, the sinusoid signals representing the sub-carrier signals are power amplified by using linear and/or nonlinear stages individually and, in most cases, in parallel. In one embodiment of the invention, where a constant-amplitude phase-modulated sinusoid signal is generated for each sub-carrier, the power amplification is done with high-efficiency nonlinear power amplifiers such as class C power amplifiers, or done with linear power amplifiers of small peak setting. A combination of linear and non-linear power amplifiers may be used for individual sub-carrier signals if desired.

According to the invention, the power amplified sub-carrier signals are added using one or multiple stages of analog combining devices. Analog multiplexers are examples of combiner circuits suitable for use in combining the power amplified signals in accordance with the present invention.

The individual sub-carrier signals as well as the transmitted signal (TS), generated by combining the sub-carriers signals, may be passed through filters to limit out-of-band spectral emissions. According to the invention, one or more filters are put in various places in the sub-carrier paths and/or in the transmission signal path. Suitable locations for such filters include after the combining devices used to generate the transmission signal, between the combining stages, and in the individual sub-carrier signal paths. In the individual sub-carrier signal paths filters may be placed e.g., after the power amplifiers of individual sub-carrier, before the combining devices, and/or before power amplification.

To facilitate signal reception at the receiver, according to the invention, the cyclic prefix added in the transmitted OFDM signal should effectively cover the majority of the transient responses due to various transmit components. To insure that cyclic prefixes are of the proper duration and thus length, in accordance with one feature of the present invention signal delays, e.g., group delays, in the signal paths which are traversed are determined, e.g., through the use of a computer system. Signal delays in this context may include transient responses introduced by various components, e.g., filters and/or amplifiers. In this manner, signal delays such as those introduced by setting the phase and amplitude of each sub-carrier and filtering, in addition to the dynamic response introduced by the communication channel are taken into consideration when determining the duration of the cyclic prefix.

DETAILED DESCRIPTION OF THE INVENTION

FIG. 2 illustrates an exemplary frequency division multiplexer signal generation and transmission system capable of generating and transmitting OFDM signals, implemented in accordance with one exemplary embodiment of the present invention. As illustrated in FIG. 2, information bits to be transmitted on various sub-carriers are first mapped to complex OFDM symbols $B_1, \ldots, B_N$, e.g., one symbol per sub-carrier for each symbol period, by a digital symbol generator (DSG) 202. According to the invention, each OFDM symbol $B_k$ (where 1<k<N) is then modulated to a corresponding sub-carrier $f_k$ using a corresponding sinusoidal signal generator 204, 204' of signal generator module 203, thereby generating an analog sinusoid signal for one symbol duration for each sub-carrier. The symbol duration is equal to the inverse of the spacing between two adjacent sub-carriers, plus the duration of a cyclic prefix portion to be discussed below. Each complex OFDM symbol to be transmitted is used to convey information bits to be communicated. In one embodiment of the invention, the OFDM symbols corresponding to each sub-carrier at different symbol durations are of constant or near constant amplitude, thereby leading to a constant or near constant-amplitude phase-modulated sinusoid signal for each sub-carrier. In such a case, the amplitude of different sub-carrier signals may differ with the maximum amplitude of a particular sub-carrier remaining constant or nearly constant over time.

According to the invention, the signals ($SS_1-SS_N$) of all the sub-carriers are power amplified individually. In several embodiments the amplification of individual sub-carrier signals is performed in parallel, e.g., by power amplification module 205. The power amplification module 205 includes N power amplification circuits 206 thru 206', one for each of the N sinusoidal sub-carrier signals ($SS_1$ thru $SS_N$). In other embodiments sub-carrier circuitry is used on a time shared basis with amplified sub-carrier signals being buffered while the amplification circuitry is reused to amplify another sub-carrier signal. It is also possible in some embodiments to use sub-carrier circuitry for some sub-carriers on a time shared basis while sub-carrier circuitry for other sub-carriers is not reused on a time shared basis.

The power amplification is performed using linear and/or nonlinear stages, e.g., one or more power amplification circuits per sub-carrier signal. Because the signal of each sub-carrier is substantially a sinusoid waveform, and in the exemplary embodiment is of constant or near constant amplitude, high efficiency power amplification devices may be used as amplification circuits 206, 206'. As will be discussed further below, in one particular embodiment, power amplification is done with nonlinear power amplifiers, e.g., high-efficiency class C power amplifiers. In another embodiment power amplification is done with linear power amplifiers, wherein the peak to be handled by the power amplifier can be set small due to the constant or near constant signal amplitude thereby minimizing power consumption. Various combinations of linear and non-linear power amplifiers is also possible.

According to the invention, the analog power amplified sub-carrier signals ($PAS_1$–$PAS_N$) are added by one or more combining devices, e.g., analog multiplexers, which are used to implement combiner circuit 208. The combined signal TS generated by combiner circuit 208, is transmitted over the communication channel 210.

In order to control the out-of-band spectral emission of the transmitted signal, according to the invention, as will be discussed in detail below, filters maybe used at various places in the signal processing path shown in FIG. 2.

Various components in the communication system 200, such as the signal generators 204, 204' used to generate the sinusoid signals $SS_1$–$SS_N$ and filtering circuits to be discussed below, can introduce transient responses into the transmitted signal TS. Those transient responses can convolve with the dynamic response introduced by the communication channel 210 when the signal reaches a receiver. In order to facilitate signal reception at the receiver, the length of the cyclic prefix is chosen, in accordance with one feature of the present invention, to cover the majority of the combined transient and dynamic responses.

Figure 3B:
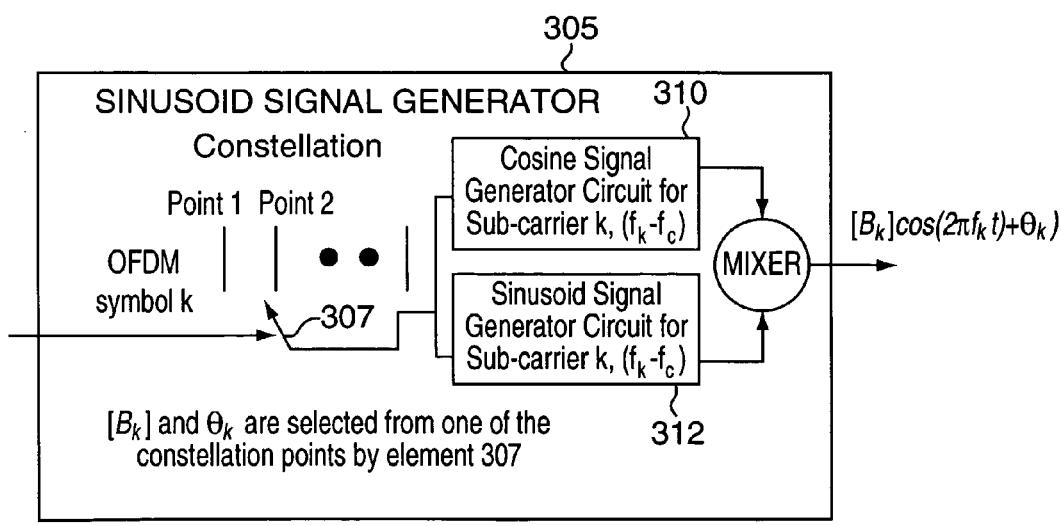

FIGS. 3A and 3B illustrated sinusoid signal generators 304, 305 for generating an analog passband sinusoid signal for a single sub-carrier, k which may be any one of the N sub-carriers. In the FIG. 2 system, for every symbol duration, a sinusoid signal is generated for each sub-carrier, where the phase and the amplitude are given by the OFDM symbol that is to be conveyed on that sub-carrier. The sinusoid signal generators 304, 305 may be used as any one of the generators 204, 204' illustrated in FIG. 2.

The sinusoid signals generated by the generators 304, 305 are bandpass. These signals can be generated directly in the bandpass as in the FIG. 3A embodiment or can first be generated in the baseband and then mixed to the carrier frequency as in the FIG. 3B embodiment. Alternatively, the sinusoid signals can be output as baseband signals, wherein the signals are to be mixed to the carrier frequency in a later stage, that is, after power amplification.

The signal generator module 304 illustrated in FIG. 3A includes a switching element 307 for extracting the values $|B_k|$ and $\theta_k$ which are then used by the sinusoid signal generator circuit 308 to generated the bandpass signal $|B_k|\cos(2\pi f_k t+\theta_k)$. N of the signal generators 304 may be used to implement the signal generator module 203.

Similar to that shown in FIG. 3A, a bandpass signal $|B_k|\cos(2\pi f_k t+\theta_k)$ can be generated as shown in FIG. 3B from a pair of baseband sinusoid signals $|B_k|\cos(2\pi(f_k-f_c)t+\theta_k)$ and $|B_k|\sin(2\pi(f_k-f_c)t+\theta_k)$, which are mixed to the carrier frequency by mixer 312 to generate the passband signal $|B_k|\cos(2\pi f_k t+\theta_k)$. The signal generator 305 includes switching element 307 for extracting the values $|Bk|$ and $\theta_k$ which are then used by the cosine signal generator circuit 310 and sinusoid signal generator circuit 312 to generate the baseband signals $|B_k|\cos(2\pi(f_k-f_c)t+\theta_k)$ and $|B_k|\sin(2\pi(f_k-f_c)t+\theta_k)$, respectively.

The phase and the amplitude of the waveforms are set by the OFDM symbol at the beginning of the OFDM symbol duration. From one symbol duration to another, the baseband sinusoid signals are generated from different sets of OFDM symbols. In the cases where the OFDM symbols for a sub-carrier have the constant amplitude, for example, when the OFDM symbols are generated with phase-modulation methods, only the phase is set from one OFDM symbol duration to another, thereby resulting in a constant-amplitude phase-modulated sinusoid signal for each sub-carrier.

In FIG. 3A, each digitally generated OFDM symbol is supplied to switch device 307 which controls the phase and the amplitude of the corresponding sinusoid or cosine signal generator 308, 310, 312 at the beginning of the OFDM symbol duration from a given constellation set, and maintains the values for the entire symbol duration. The switch device 307 operates at the OFDM symbol rate and generates discrete outputs whose range is determined by the constellation size of the OFDM symbols.

In reality, the signal generators 304, 305 are not be able to change the phase and the amplitude instantly. Instead, a transient period exists at the beginning of the OFDM symbol duration, during which the actual signal generated by the signal generator 304, 305 is not a constant-amplitude phase-modulated sinusoid as desired. In one embodiment to eliminate or minimize any resultant adverse impact, the cyclic prefix added to the OFDM symbol duration is made as long or longer than the transient period.

In another embodiment of the invention, not shown in FIG. 3, a digital device, such as a digital signal processor, is used to generate a sequence of discrete samples of the sinusoid signal from the OFDM symbol. Those discrete signal samples are passed through a D/A device to generate the required sinusoid waveform.

Figure 4:
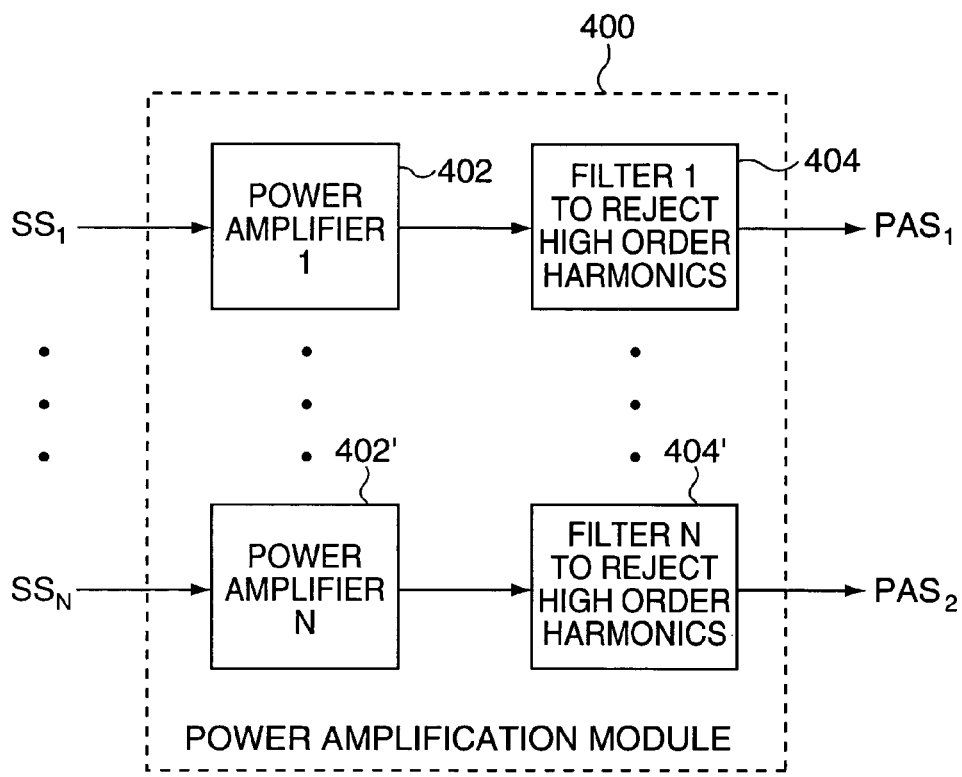
FIG. 4 illustrates a power amplification module implemented in accordance with one embodiment of the present invention.

FIG. 4 illustrates a signal power amplification module 400 implemented in accordance with one embodiment of the present invention. The amplification module 400 may be used in place of the power amplification module 205 in the system 200.

As discussed above, according to the invention, the sinusoid signals of the sub-carriers are power amplified by means of linear and/or nonlinear stages individually and in parallel prior to being combined.

In the cases where a constant or near constant-amplitude phase-modulated sinusoid signal is generated for each sub-carrier, the power amplification is done with high-efficiency, power amplifiers which may be non-linear. In one version of the FIG. 4 embodiment, power amplifiers 1 thru N, 402, 402' are non-linear class C power amplifiers. In both the FIG. 2 and FIG. 4 embodiments, one power amplifier is used for the sinusoid signal of each sub-carrier. In the case of using nonlinear power amplifiers as in the FIG. 4 example, the output of each power amplifier 402, 402' may include high-order harmonics. In the FIG. 4 embodiment, filters 404, 404' are included after each power amplifier 402, 402' to eliminate or reduce high-order harmonics from the amplified sub-carrier signals.

Figure 5:
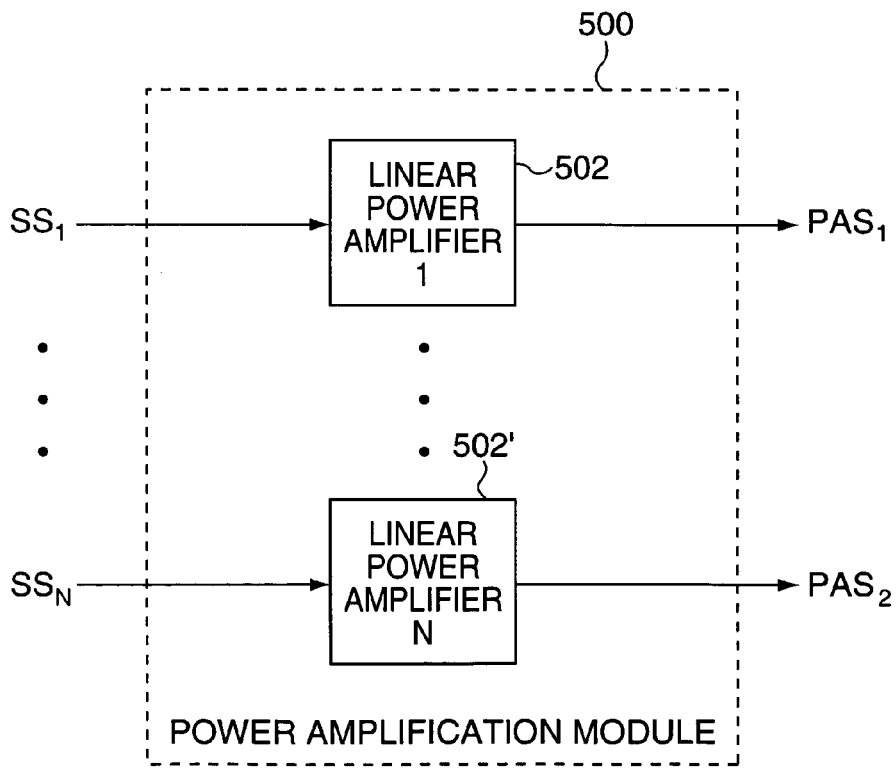
FIG. 5 illustrates a power amplification module implemented in accordance with another embodiment of the present invention.

In the alternative embodiment illustrated in FIG. 5, linear power amplifiers 502, 502', one per sub-carrier, are used to implement a power amplification module 500 which may be used in place of the module 205 illustrated in FIG. 2. In the FIG. 5 embodiment, the peak to be handled by the power amplifier can be set to be small to reduce power consumption, since the input sinusoid signal representing one of the sub-carrier signals (SS1–SSN) should have a good peak-to-average power ratio.

Figure 6:
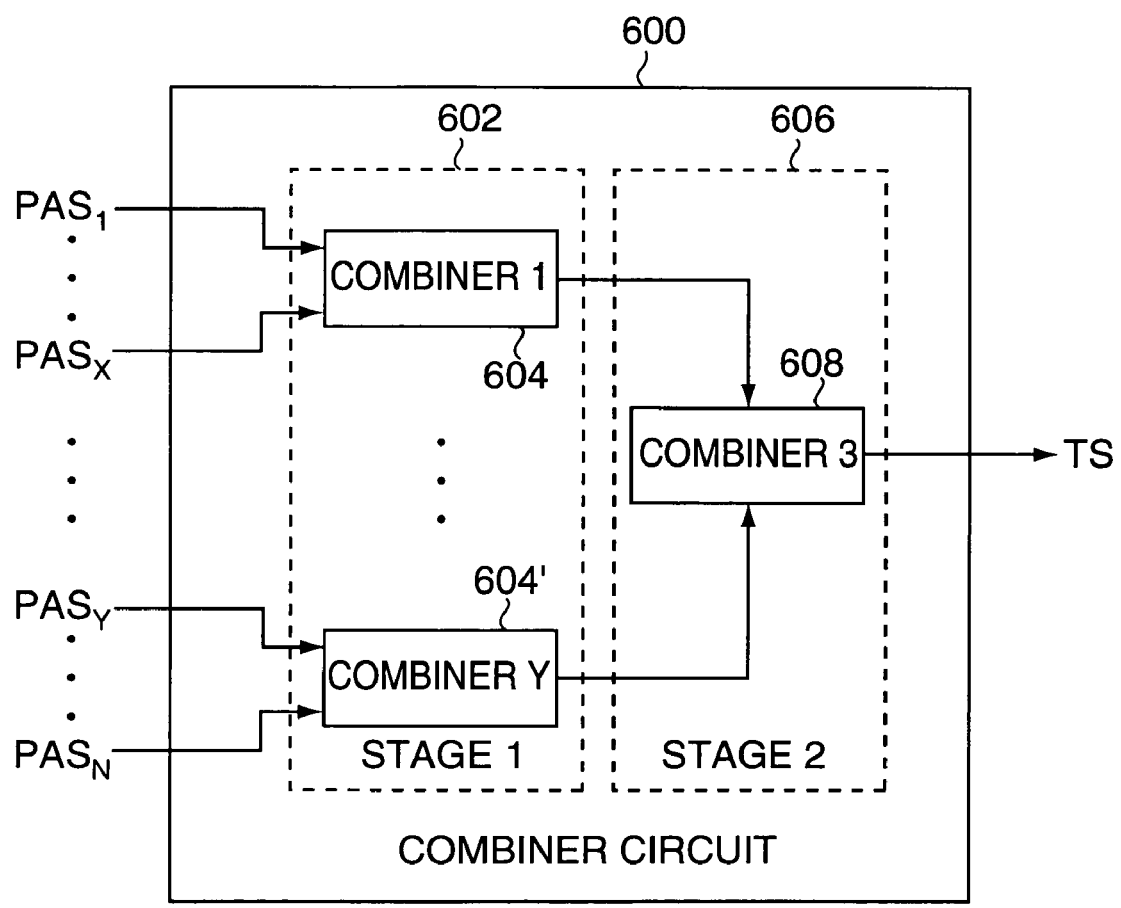
FIG. 6 illustrates a multi-stage combiner circuit implemented in accordance with the present invention.

FIG. 6 illustrates a combiner circuit 600 which may be used in place of the combiner circuit 208 illustrated in FIG. 2. In accordance with the present invention, the outputs of the power amplifiers representing power amplified signals ($PAS_1$–$PAS_N$) for each sub-carrier are added together. This may be done using a single combining circuit (summer) or using multiple combining circuits, each with a relatively small number of inputs, arranged in stages. The combiner circuit 600 illustrated in FIG. 6 incorporates two states 602, 606 although more stages are possible. In the first stage 602, small subsets of the power amplifier output signals PAS are first added together to produce intermediate signals. For example signals $PAS_1$ trough $PAS_X$ are combined by the first combiner 1 604 to form a first intermediate signal. The signals $PAS_Y$ through $PAS_N$ are combined by combiner Y 604' to form another intermediate signal. Additional combiners in the first stage may also produce intermediate signals. The intermediate signals generated by the first sated 602 are then combined in the second stage by combiner 608 to form the combiner circuit output signal TS.

Figure 7:
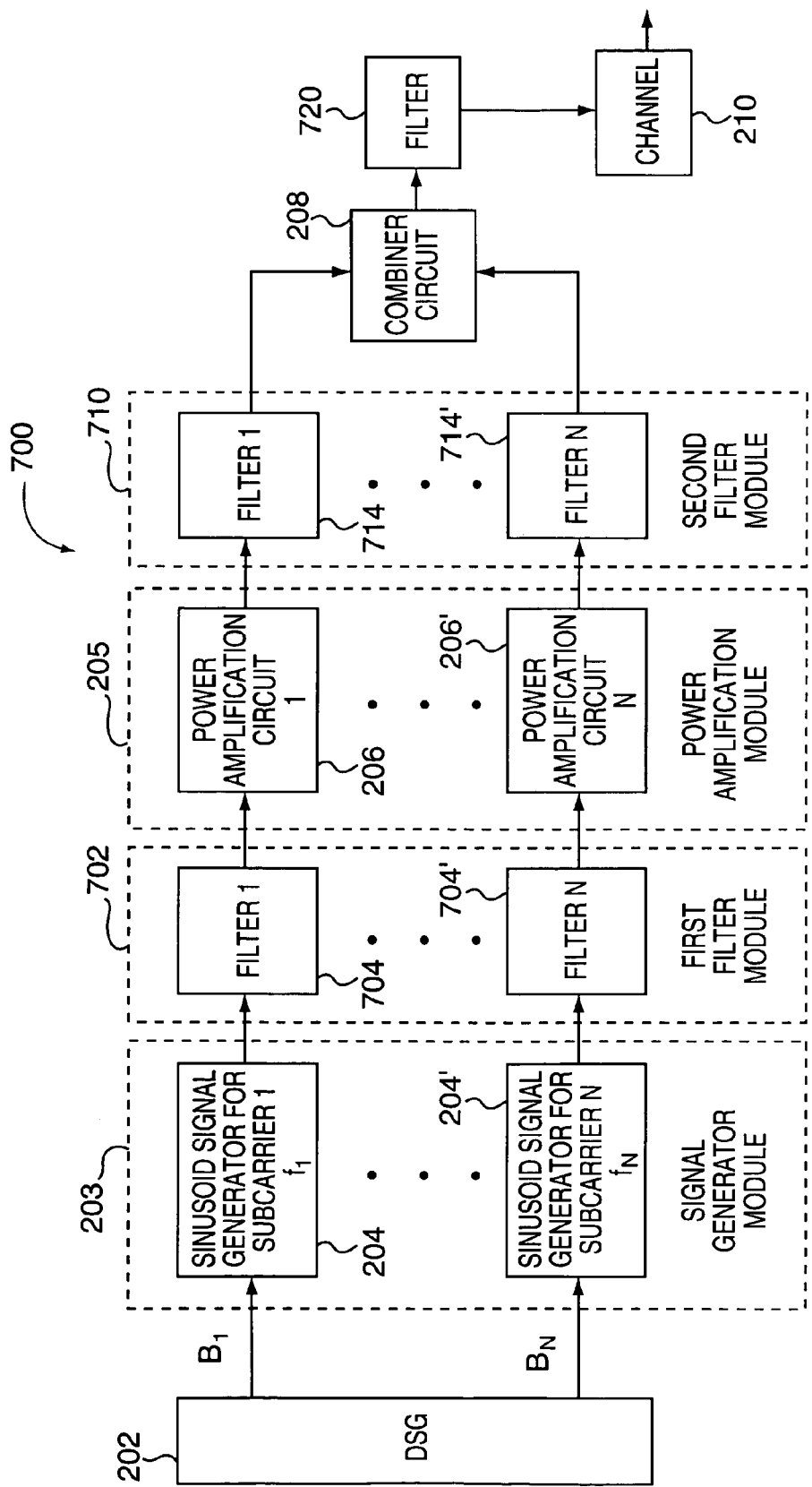
FIG. 7 illustrates an additional system for generating and transmitting OFDM signals implemented in accordance with an embodiment of the present invention which uses filters in the signal transmission path.

As discussed above, filters may be used at various points during the processing of signals by the system 200, e.g., to control out-of-band spectral emissions illustrated in FIG. 2. FIG. 7 illustrates a system 700 which is similar to the system 200 but includes optional filtering circuitry. The FIG. 7 filter circuitry includes first and second filter modules 702, 710, which each include one filter for each of the N sub-carrier signals. In addition, the filter circuitry includes a filter 720 which is used to filter the signal TS generated by the combiner circuit 208 prior to transmission over the communications channel 210.

As shown in FIG. 7, filters 704, 704' can be placed after the sinusoidal signal generators 204, 204', between the power amplification circuits 206, 206' and combiner circuit 208, and after the combiner circuit 208. In addition, one or more filters can be placed between combining stages, e.g., between stages 602, 606 in a multi-stage combiner circuit such as the one illustrated in FIG. 6.

Filters elements in a communications path including the communications channel itself can introduce group delay which is signal delay which is dependent on frequency. As a result the different frequency components of a pulse launched into a communications path will arive at the destination with slightly different delays. Both frequency-dependent attenuation and the group delay cause dispersion on the transmission line, i.e., the spreading in time of a transmitted pulse.

Thus, filters in the paths of subcarrier signals can introduce group delays into the subcarrier signals while filters in the path of the combined signal TS can introduce group delays into the transmission signal TS. Additional group delays may be introduced into the signal TS by the communications channel 210. As discussed above, the cyclic prefix duration may, and in various embodiments of the present invention is, selected to be of sufficient duration that it will cover the group delays introduced by the filters in the subcarrier signal paths, the combined signal path and the transmission channel.

Figure 8:
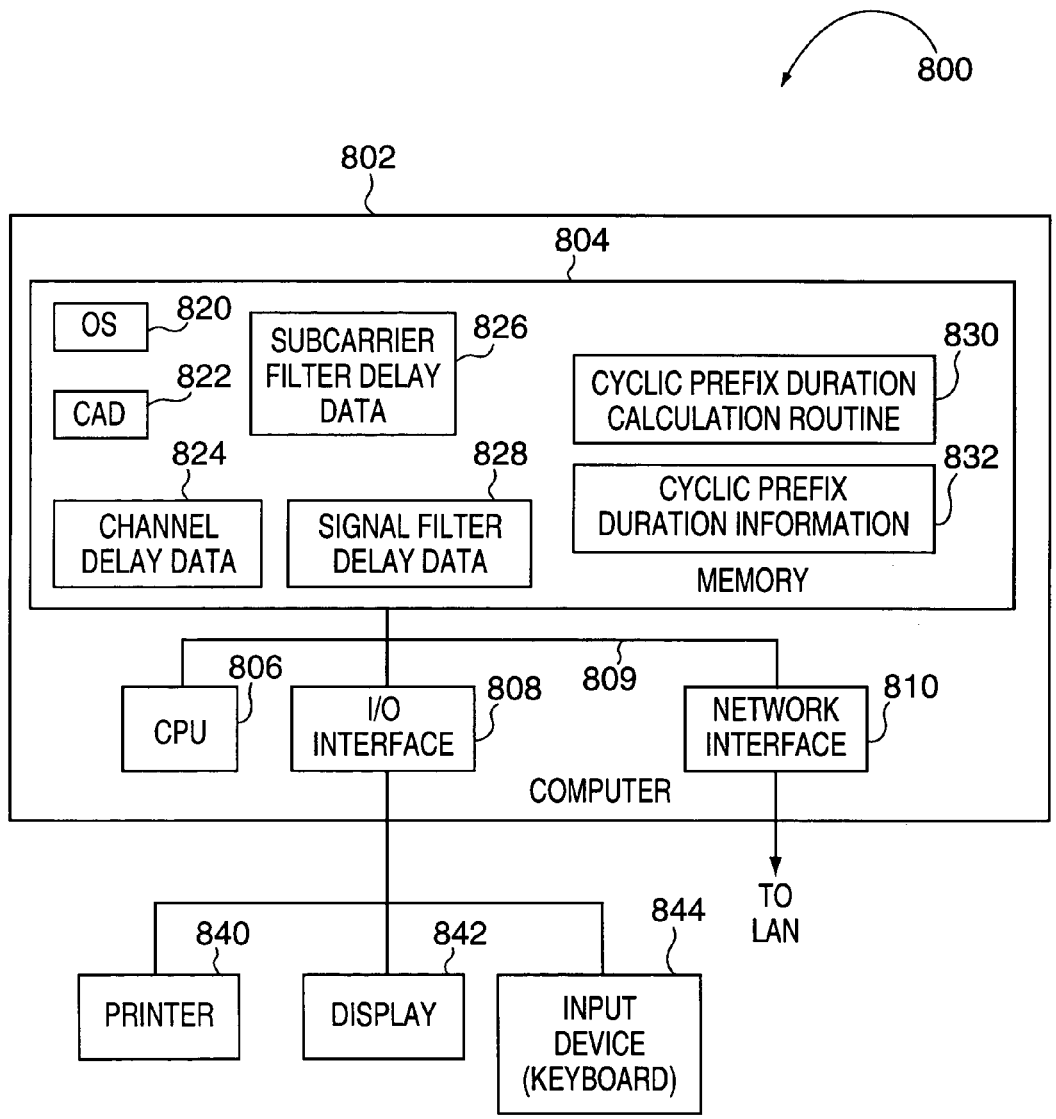
FIG. 8 illustrates a computer system which can be used for calculating cyclic prefix duration values in accordance with the present invention.

FIG. 8 illustrates a computer system 800 which may be used for calculating cyclic prefixes to be used with OFDM communication systems such as the system 700 illustrated in FIG. 7. The computer system 802 includes a memory 804, e.g., RAM and/or ROM, a central processing unit (CPU) 806, input/output (I/O) interface 808 and a network interface 810 which are coupled together by a bus 809. The I/O interface 808 is coupled to various input devices such as keyboard 844 and output devices such as printer 840 and display 842. Via network interface 810 the computer system 800 is coupled to a local area network (LAN) over which it can receive information, e.g., channel and filter delay information and can output information such as calculated cyclic prefix duration values.

The computer system's memory 804 includes a plurality of routines, applications, programs and data used by the CPU 806 in performing various operations and calculations. In particular, memory 804 includes an operations system (OS) 820, computer added design program (CAD) 822, channel delay data 824, signal filter delay data 828, a cyclic prefix duration calculation routine 830 and cyclic prefix duration information 832. Channel delay data 824 may include data on various empirically determined values obtained by measuring actual channel conditions over a period of time. Signal filter delay data 828 includes information on the group signal delays introduced by filters which may be used in various subcarrier signal paths and/or in the common signal path traversed by the transmission signal (TS). The cyclic prefix duration calculation routine 830, is used in accordance with the present invention to calculate a cyclic prefixed to be used based on the signal delays introduced by the filter or filters included in the subcarrier signal paths, common transmission signal path, and communications channel. The cyclic prefix duration information 832 includes cyclic prefix duration values calculated by the routine 830 for various communications systems, e.g., communications systems of the type illustrated in FIG. 7.

Printer 840 and display 842 can be used for outputting various information and data including cyclic prefix duration information, while input device, e.g., keyboard 844, can be used for inputting information, e.g., signal path and filter information into the computer system 800.

The CAD routine 822 supports various communications system design capabilities. When designing frequency division multiplexed communications systems which amplify subcarrier signals separately, such as the system illustrated in FIG. 7, CAD routine 822 can call the cyclic prefix duration calculation routine 830 to calculate a cyclic prefix duration to be used in a particular communications system.

Figure 9:
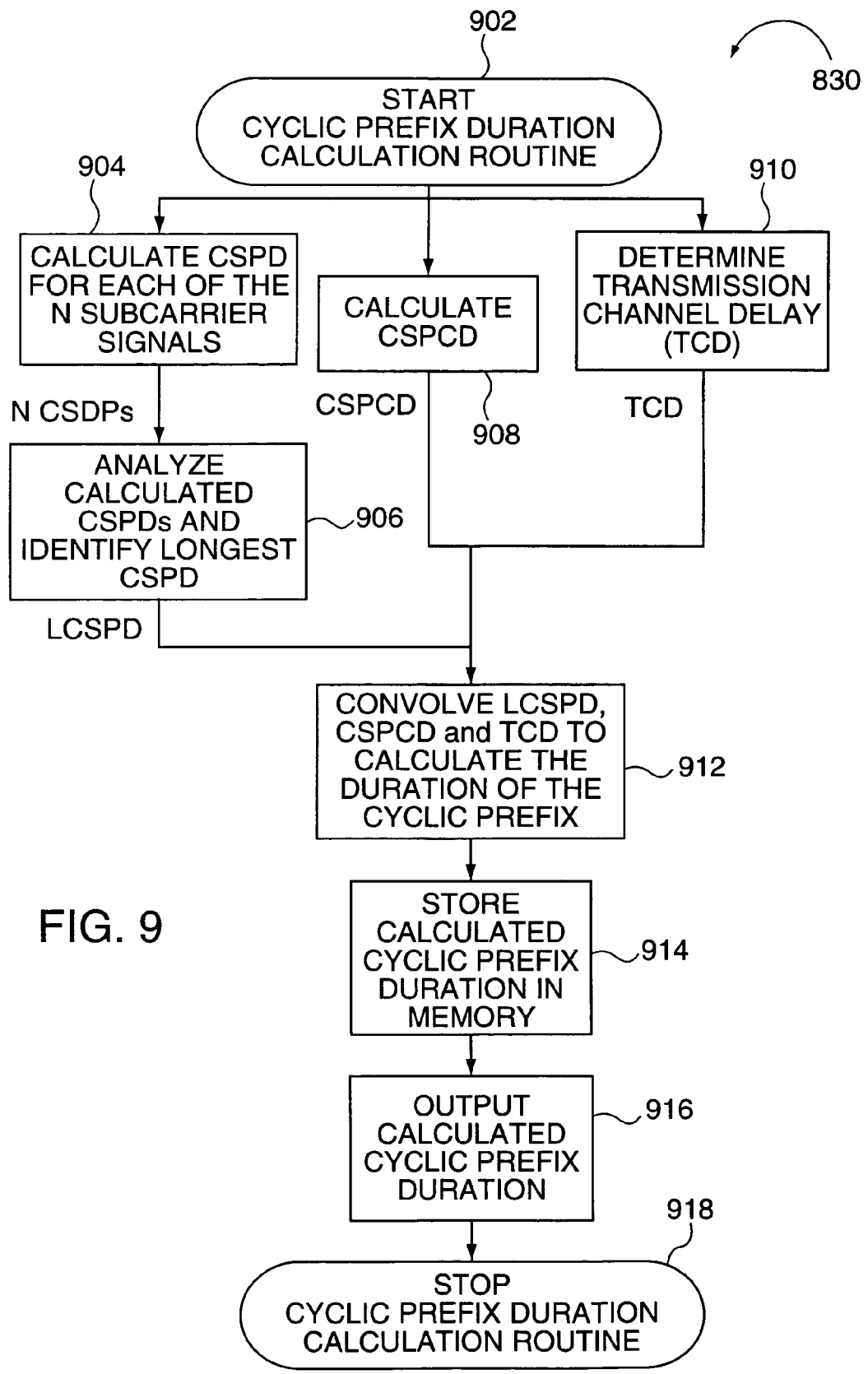
FIG. 9 illustrates an exemplary cyclic prefix duration calculation routine.

The steps of an exemplary cyclic prefix duration calculation routine 830, implemented in accordance with the present invention, are illustrated in FIG. 9. The cyclic prefix duration calculation routine 830 begins in step 902 when it is executed by CPU 806. Operation proceeds, e.g. branches, from start step 902 to steps 904, 908 and 910 which may, but need not be, performed in parallel.

Since the signal paths for each of the N subcarrier paths may include different filters, the cumulative group signal delay introduced by filters in one subcarrier signal path may be different from the cumulative group signal delays introduced by filters in another subcarrier signal path. To determine the duration of the cyclic prefix for a transmitted signal TS, the cumulative group signal delay for each of the individual subcarrier paths, referred to herein as the subcarrier path delay (CSPD), is calculated in step 904, e.g., by convolving the group signal delays introduced by the filters in the particular subcarrier path. For purposes of CSPD calculations, information on the filters present in a particular subcarrier's path is obtained in step 904 from the CAD program 822 while the group signal delay associated with each of the utilized subcarrier filters is obtained from the set of subcarrier filter delay data 826. The N CSPDs generated in step 904 are then analyzed and the longest of the N CSPDs (LCSPD) is identified in step 906. The LCSPD determined in step 906 serves as input step 912.

In addition to determining a LCSPD, a common signaling path cumulative group signal delay (CSPCSD) is determined for purposes of calculating cyclic prefix duration. This occurs in step 908. The CSPD can be calculated by convolving the group signal delays for filters included in the common signaling path, e.g., the path existing between the point where the TS signal is produced by combining the subcarrier signals and the communications channel. The CAD program 822 is responsible for providing information on what filters if any are in the common signal path while the delays introduced by such filters is obtained from signal filter delay data 828. The CSPD determined in step 908 is supplied to step 912.

In step 910, the group signal delay of the transmission channel, i.e., the transmission channel delay (TCD) is determined from channel delay data 824 which may include various empirical measurements of the communications channel 210. The TCD, like the LCSPD and TCD, is supplied to step 912 wherein it is used to calculate the duration of the cyclic prefix. In step 912 the LCSPD, CSPCD and TCD are convolved to produce a cyclic prefix duration value (CPDV). The generation of the CPDV may be expressed as follows:

$$CPDV = LCSPD * CSPD * TCD, \text{ where * represents a convolution operation.}$$

The CPDV calculation performed, in step 912, may, alternatively, be expressed as a sum of weighted values as follows:

$$CPDV = W_1(LCSPD) + W_2(CSPD) + W_3(TCD)$$

Suitable values for weights $W_1$, $W_2$, and $W_3$ may be determined empirically. In the simplest case, $W_1 = W_2 = W_3 = 1$ simplifying the CPDV calculation to a simple sum of the LCSPD, CSPD and TCD values as follows:

$$CPDV = LCSPD + CSPD + TCD$$

Following calculation of the CPDV, in step 914, the CPDV is stored in memory e.g., in the set of cyclic prefix duration information 832. The CPDV is then output in step 916, e.g., by displaying the CPDV on display 842, printing it on printer 840 or transmitting it to a device connected to computer system 800, e.g., a cyclic prefix generator of a communications system via the network interface 810. With the CPDV value generated, stored and output, the cyclic prefix duration calculation routine 830 stops in step 918 until being executed again by the CPU 806 at some future time.

The CPDV generated using routine 830 may be used as a minimum cyclic prefix duration with the actual utilized cyclic prefix having a duration equal to or longer than the calculated cyclic prefix duration. Longer cyclic prefix durations may be used to take into consideration, e.g., unexpected channel delays and/or changes in channel conditions which may cause the actual channel delay to differ from the calculated channel delay.

In the above described embodiments, the output of the digital symbol generator 202, e.g., the digital symbols corresponding to the individual sub-carriers, is processed to generate the analog sub-carrier signals. A cyclic prefix having a duration at least as long as the calculated cyclic prefix discussed above is inserted between each of the symbols included in the analog subcarrier signals. A cyclic prefix insertion device, such as the cyclic prefix generator module 1102, may be used to insert a cyclic prefix between symbols, e.g., by inserting the prefix at the front of a symbol in an analog sub-carrier signal. In accordance with the present invention, the inserted cyclic prefix normally includes a copy of the last portion, e.g., bits, of the preceded symbol with the number of duplicated bits being determined by the duration of the cyclic prefix.

Figure 11:
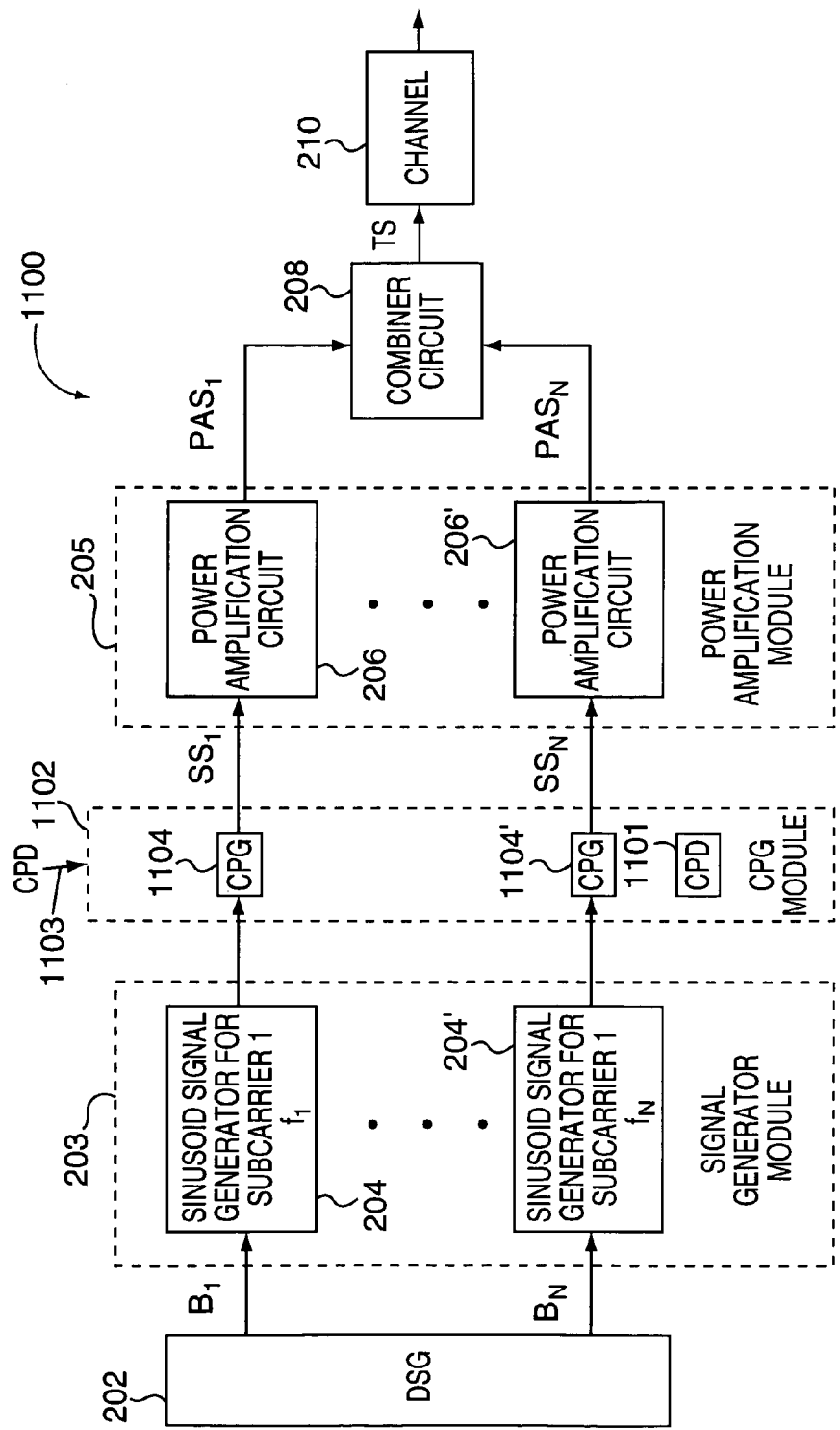
FIG. 11 illustrates another embodiment of the communications system of the present invention with circuitry for generating cyclic prefixes shown.

FIG. 11 illustrates an communications system 1100 which includes a cyclic prefix generation module 1102 having one cyclic prefix generator (CPGs) 1004, 1004' for each one of the N analog sub-carrier signals. Each CPG 1004, 1004' may store information on the duration of the cyclic prefix, e.g., the length of the signal or the number of bits to be used for the cyclic prefix. The cyclic prefix duration (CPD) may be determined in the manner described above in regard to FIG. 9 and then loaded into each of the CPGs 1004, 1004' via the CPD input 1103. Thus, CPG module 1103 can be coupled to the computer system 800 or a system storing the generated CPD value. In one embodiment the CPD is stored in memory included in each CPG 1004 while in another embodiment, a common CPD memory location 1101 in the CPG module 1102 is used to store the CPD value. Memory location 1101, when used, can be accessed by each of the CPG circuits 1104, 1104'.

Figure 10:
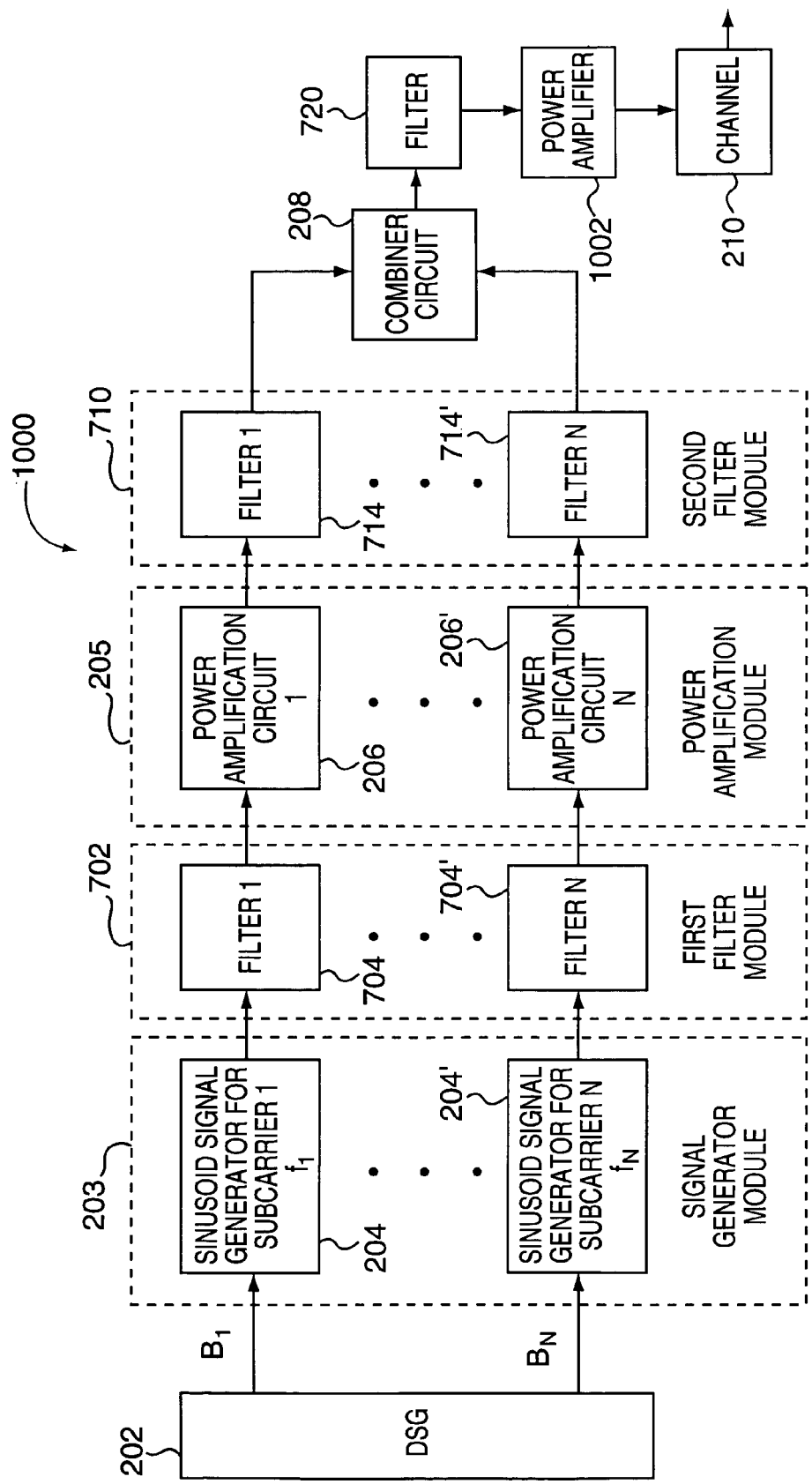
FIG. 10 illustrates a communications system wherein power amplification of the transmission signal is performed in addition to power amplification of individual subcarrier signals.

While various exemplary embodiments have been described above for purposes of explaining the present invention, numerous variations are possible while remaining within the scope of the present invention. For example, in addition to the power amplification applied to individual subcarrier signals, additional power amplification can be applied to the generated transmission signal, TS, prior to its transmission over the communications channel 210. FIG. 10 illustrates such an embodiment wherein linear power amplifier 1002 is used to amplify the signal TS.

In addition, it should be noted that linear power amplifiers may be used to amplify some subcarrier signals with non-linear amplifiers being used to amplify other subcarrier signals. Alternatively, a combination of linear and non-linear amplifiers may be used to amplify an individual subcarrier signal.

In accordance with the present invention, a different stream of digital symbols is supplied to each of the subcarrier signal generators 204, 204'. In order to allow for the use of fixed gain power amplification circuits 206, 206' in various embodiments the power of the digital symbol stream corresponding to an individual subcarrier signal is kept constant or relatively constant over time. In this manner, fixed gain amplifiers may be used to amplify the analog subcarrier signals. While the power of individual subcarrier signals may be constant or nearly constant over time, different gains and power levels may be used with different subcarrier signals.

What is claimed is:

1. A method for use with a communication system including a plurality of subcarrier signal paths, a common signal path and a communications channel having a communications channel group signal delay, the method comprising the steps of:
   operating a processing device to calculate a subcarrier signal path group signal delay introduced by a first one of the subcarrier signal paths;
   operating said processing device to calculate a common signal path group signal delay introduced by the common signal path;
   generating, as a function of the calculated subcarrier signal path group signal delay, calculated common signal path group signal delay, and communications channel group signal delay, a minimum cyclic prefix duration.

2. The method of claim 1, wherein the step of generating a minimum cyclic prefix duration includes the step of:
   operating the processor to calculate a weighted sum of the calculated subcarrier signal path group signal delay, calculated common signal path group signal delay, and communications channel group signal delay.

3. The method of claim 1, wherein the step of generating a minimum cyclic prefix duration includes the step of:
   operating the processor to convolve the calculated subcarrier signal path group signal delay, calculated common signal path group signal delay, and communications channel group signal delay.

4. The method of claim 1, further comprising the step of:
   operating a prefix signal generator to generate cyclic prefixes having a duration at least as long as said minimum cyclic prefix duration.

5. The method of claim 4, using different cyclic prefix generators working in parallel to generate cyclic prefixes to be inserted into subcarrier signals being transmitted on different ones of said subcarrier signal paths.

6. The method of claim 4,
   wherein the first one of the subcarrier signal paths is the one of the plurality of subcarrier signal paths which introduces the longest group signal delay into a subcarrier signal, and
   wherein the step of operating a processing device to calculate a subcarrier signal path group signal delay introduced by a first one of the subcarrier signal paths includes:
      operating the processor to calculate a subcarrier signal path group signal delay introduced by each one of the subcarrier signal paths; and
      identifying the longest one of the calculated subcarrier signal path group signal delays as said subcarrier signal path group signal delay introduced by the first one of the subcarrier signal paths.

7. The method of claim 1,
   wherein the first one of the subcarrier signal paths is the one of the plurality of subcarrier signal paths which introduces the longest group signal delay into a subcarrier signal, and
   wherein the step of operating a processing device to calculate a subcarrier signal path group signal delay introduced by a first one of the subcarrier signal paths includes:
      operating the processor to calculate a subcarrier signal path group signal delay introduced by each one of the subcarrier signal paths; and
      identifying the longest one of the calculated subcarrier signal path group signal delays as said subcarrier signal path group signal delay introduced by the first one of the subcarrier signal paths.

* * * * *